United States Patent [19]
Weng et al.

[11] Patent Number: 6,081,273
[45] Date of Patent: Jun. 27, 2000

[54] METHOD AND SYSTEM FOR BUILDING THREE-DIMENSIONAL OBJECT MODELS

[75] Inventors: Juyang Weng, Okemos; David James Hammond, East Lansing, both of Mich.

[73] Assignee: Michigan State University, East Lansing, Mich.

[21] Appl. No.: 08/594,701

[22] Filed: Jan. 31, 1996

[51] Int. Cl.[7] .................................................. G06T 7/00
[52] U.S. Cl. ..................................... 345/425; 382/154
[58] Field of Search .................................. 345/420, 425, 345/430, 441; 382/154

[56] References Cited

U.S. PATENT DOCUMENTS

| | | | |
|---|---|---|---|
| 4,704,627 | 11/1987 | Yuyama et al. | 358/88 |
| 4,815,819 | 3/1989 | Mayhew et al. | 350/144 |
| 4,858,157 | 8/1989 | Murai et al. | 364/560 |
| 4,905,081 | 2/1990 | Morton | 348/43 |
| 4,956,706 | 9/1990 | Ohba | 358/93 |
| 4,966,436 | 10/1990 | Mayhew et al. | 350/143 |
| 4,993,836 | 2/1991 | Furuhashi et al. | 356/376 |
| 4,994,989 | 2/1991 | Usami et al. | 364/522 |
| 5,013,147 | 5/1991 | Montes | 352/58 |
| 5,014,126 | 5/1991 | Pritchard et al. | 358/91 |
| 5,063,441 | 11/1991 | Lipton et al. | 358/88 |
| 5,065,236 | 11/1991 | Diner | 358/88 |
| 5,101,268 | 3/1992 | Ohba | 358/88 |
| 5,142,642 | 8/1992 | Sudo | 358/88 |
| 5,377,320 | 12/1994 | Abi-Ezzi et al. | 395/163 |
| 5,528,194 | 6/1996 | Ohtani et al. | 382/154 X |
| 5,748,199 | 5/1998 | Palm | 345/419 |
| 5,793,372 | 8/1998 | Binns et al. | 345/419 |

OTHER PUBLICATIONS

J. Weng, P. Cohen and M. Hernious, Camera Calibration With Distortion Models and Accuracy Evaluation, IEEE Transactions on Pattern Analysis and Machine Intelligence, vol. 14, No. 10, Oct. 1992, pp. 965–980.

*An Overview of Apple's QuickTime VR Technology*, http:;// quicktime.apple.com/qtvr/qtvrtech.html.

M. Tuceryan, D. Greer, R. Whitaker, D. Breen, C. Crampton, E. Rose, and K. Ahlers, Calibration Requirements and Procedures for a Monitor–Based Augmented Reality System, IEEE Transactions on Visualization and Computer Graphics, pp. 255–257, vol. 1, No. 3, Sep. 1995.

Dana Ballard, Christopher Brown, *Computer Vision*, Appendix a, Prentice–Hall, 1982, pp. 52–56.

*Primary Examiner*—Mark K. Zimmerman
*Attorney, Agent, or Firm*—Brooks & Kushman P.C.

[57] ABSTRACT

A method and system for building virtual reality object models. The method includes defining an object space, generating multiple two-dimensional real images of the object, and selecting multiple reference points in each image, the reference points defining an image region, the region having a texture. The method also includes determining the three-dimensional position in the object space of each of the reference points in each image, the positions determined defining a model surface, mapping the texture of an image region onto a model surface, and generating a three-dimensional model of the object using the determined positions and the mapped texture. The system includes one or more cameras, a calibration apparatus, a graphic interface and software for performing the method.

18 Claims, 4 Drawing Sheets

METHOD AND SYSTEM FOR BUILDING THREE-DIMENSIONAL OBJECT MODELS

TECHNICAL FIELD

This invention relates to a method and system for building texture-mapped three-dimensional virtual reality object models from multi-view camera images.

BACKGROUND ART

Realistic three-dimensional (3D) models are increasingly common in many computer graphic areas. They are used in virtual reality walkthroughs, animation, solid modeling, visualization, and multimedia. Such models are also increasingly available on the Internet in a wide variety of application fields such as marketing, education, entertainment, interior and architectural design, fashion design, and others.

Indeed, many 3D modeling method and systems exist today. Three-dimensional models may be generated using CAD software and graphics luminance models. Such methods and systems, however, place a very heavy burden on the user who must supply mathematical models for texture, shading, geometric shape and lighting of the complex real world environment to be modeled. Due to human limitations and incomplete information about the objects to be modeled, it is very difficult to derive complete mathematic models and supply all necessary parameters. Building high complexity models is therefore tedious and extremely time-consuming.

Furthermore, while such methods and systems include texture mapping capabilities, they are incapable of producing realistic graphics rendering because of limitations on computer speed, object shape models, and object texture models. For example, it is very difficult to model the texture of a human face or a tree. Even if realistic texture is available, existing methods and systems do not provide adequate tools to match each texture of the object to each face of the model. Rather, each image must be mapped to the appropriate model face individually, in a piece-meal fashion.

Other methods and systems, which use laser scanning and range sensing hardware to generate 3D information and image texture from and object, are very expensive and therefore inaccessible to most people. In addition, the complex hardware is difficult to repair or replace.

Such laser scanner methods and systems are also intrusive. For example, a human subject cannot be scanned by a strong laser with his or her eyes open. Moreover, such methods and systems cannot work with long distance, large objects, or glossy or dark surfaces. The color map from such methods and systems is also restricted by the wave-length of the laser light and therefore lacks realism.

Still another method and system exists in which, at a discrete number of vantage points, several images are taken that are then stitched together to form a panoramic screen dedicated to that vantage point. An example of such a method and system is QuickTime VR technology from Apple Inc. Since no 3D model is ever created, however, one cannot navigate continuously between vantage points while viewing. Instead, one can only jump from one vantage point to another. Moreover, many panoramic screens for different vantage points are redundant. Indeed, data representation becomes more redundant as more vantage points are used.

Thus, there exists a need for an improved method and system for building three-dimensional virtual reality object models. Such an improved method and system would overcome the problems associated with the prior art methods and systems described above.

DISCLOSURE OF INVENTION

Accordingly, it is the principle object of the present invention to provide an improved method and system for building three-dimensional virtual reality object models.

According to the present invention, then, a method and system are provided for building a virtual reality model of an object. The method comprises defining an object space, generating a plurality of two-dimensional real images of the object, and selecting a plurality of reference points in each image, the reference points defining an image region, the region having a texture. The method of the present invention further comprises determining the three-dimensional position in the object space of each of the reference points in each image, the positions determined defining a model surface, mapping the texture of an image region onto a model surface, and generating a three-dimensional model of the object using the determined positions and the mapped texture.

Similarly, the system of the present invention comprises means for defining an object space, means for generating a plurality of two-dimensional real images of the object, and means for selecting a plurality of reference points in each image, the reference points defining an image region, the region having a texture. The system further comprises means for determining the three-dimensional position in the object space of each of the reference points in each image, the positions determined defining a model surface, means for mapping the texture of an image region onto a model surface, and means for generating a three-dimensional model of the object using the determined positions and the mapped texture.

These and other objects, features and advantages will be readily apparent upon consideration of the following detailed description in conjunction with the accompanying drawings.

BEST MODE FOR CARRYING OUT THE INVENTION

In general, the method and system of the present invention generate realistically textured 3D graphics models in a quick and inexpensive fashion using color or monotone images taken from multi-view cameras. As such, the method and system are referred to as a Camera Aided Virtual Reality Builder (CAVRB). The CAVRB comprises one or several cameras, a reference object calibration apparatus and/or a focal length calibration apparatus, a graphics supported computer, and appropriate software.

In the preferred embodiment, in order to model an object, a number of pictures are taken of the object from different viewpoints. The user then defines polygon faces of the object in these views. This is done by displaying a pair of images, and letting the user draw a polygon in each, repeating as necessary. In this way, the user "traces" over the images those polygonal features found in the actual object. When the camera calibration information is known, stereo triangulation can be used to determine the corresponding 3D polygons of the object. Onto each of these is mapped the texture from the original camera image, producing a model with color and texture that accurately reflects the real object.

In the following description, feature points are points of an object that are easily identifiable by humans from images. Reference points are a special set of feature points used for reference in the calibration of camera views. Model points are a special set of feature points that are used in the generated 3D model of the object.

Figures 1A, 1B:
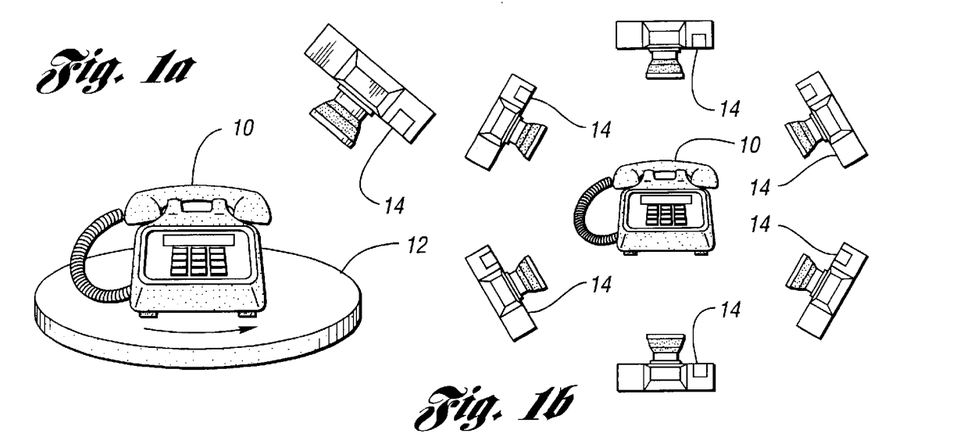
FIGS. 1a–1c are illustrations of image generation according to various embodiments of the method and system of the present invention.
Figure 1C:
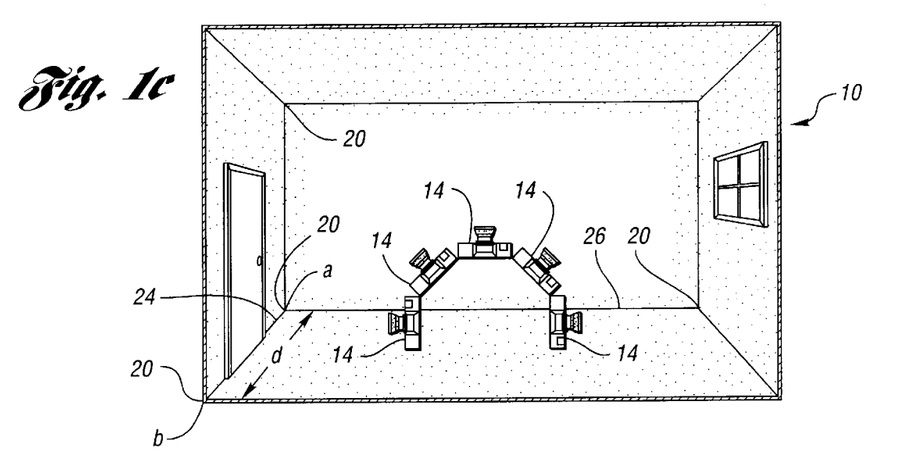

More specifically, then, referring first to FIGS. 1a–1c, image generation according to various embodiments of the present invention is shown. As seen therein, there are two types of system setup.

In FIG. 1a, a moving object (10) is shown. The object (10) to be modeled is placed on a turntable (12). A single stationary camera (14) points at the turntable (12). At various positions of the turntable (12), an image is taken. This setup is appropriate for small objects. With this setup, the ambient lighting should preferably be uniform. Outdoor lighting in an overcast day is a good approximation of such uniform lighting conditions.

FIGS. 1b and 1c show a stationary object (10) with multiple cameras (14) or a movable camera (14). This setup is appropriate for large objects that are not easily movable, e.g., models for external views of buildings, internal views of a room, or other large objects. While uniform lighting conditions are preferable with this setup, they are not necessary.

For either a moving or stationary object (10), the number of images to be taken is such that each surface be modeled is visible by at least two images to allow the CAVRB to perform stereo triangulation in order to determine the 3D position of the surface points (like human stereopsis).

Before an object (10) may be modeled, however, an object space must first be defined. To do so, the user first specifies a reference object for calibrating the camera or cameras (14) from which images of the object (10) will be taken.

Figure 2:
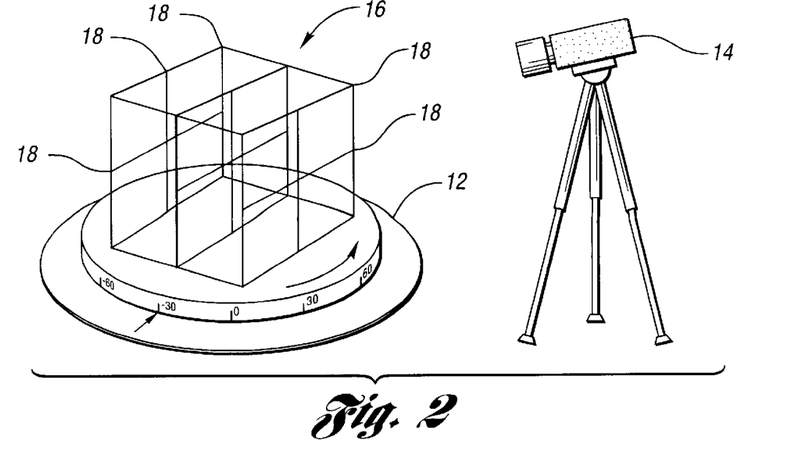
FIG. 2 is an object space calibration apparatus for one embodiment of the method and system of the present invention.

In that regard, referring now to FIG. 2, an object space calibration apparatus for one embodiment of the method and system of the present invention is shown. As seen therein, the calibration reference object may be a special 3D calibration pattern (16). This is the preferred choice because generally it gives a more accurate result. For a high accuracy, the 3D calibration pattern (16) should be similar to the size of the object (10) to be modeled. This option is appropriate when the object (10) is small enough that a 3D calibration pattern (16) of similar size can be easily constructed.

Alternatively, referring again to FIGS. 1a–1c, the object (10) itself may be used as the calibration reference. This is preferred when the object (10) to be modeled cannot be easily removed from the scene and replaced by a 3D calibration pattern, such as in FIG. 1c.

In either case, still referring to FIGS. 1a–1c and 2, for each image of an object to be modeled, an image of a calibration object must also be taken from the same view. With the turntable option (moving object), as seen in FIGS. 1a and 2, a calibration object (16) may be placed on a turntable (12), and images of it taken, e.g., every 30°. Thereafter, the object (10) to be modeled may be placed on the turntable (12), and images of it taken at the same angles.

Alternatively, as seen in FIGS. 1b and 1c, a number of cameras (14) in permanent positions or a movable camera (14) may be used in conjunction with a stationary object (10). A separate calibration object may or may not be used. That is, the object (10) to be modeled may itself act as the calibration object.

Where multiple cameras and a separate calibration object are used, the calibration object can be photographed by each camera, then replaced by the object to be modeled. Where only a single camera and a separate calibration object are used, the camera should be positioned in the same sequence of orientations used for the calibration object. Alternatively, at each camera position, an image can be taken of first the calibration object, then the model object, as long as the model object is moved back to its original orientation after photographing the calibration object (and vice-versa). Still further, for objects that cannot be moved (e.g., a building), the calibration object and the object to be modeled can also be photographed together.

Finally, as seen in FIG. 1c, another method is to use a single moving camera (14) and no separate calibration object. For example, if an interior of a room (10) (or exterior of a building) is to be modeled, a single camera (14) is used to take a number of images. The object to be modeled (10) (the room) is itself used as the calibration object.

Proper calibration also requires that the user determine the 3D position of reference points. The procedure for doing so is different according to which type of calibration object is chosen. Referring again to FIG. 2, the 3D calibration pattern (16) may be placed at the position of the object (e.g., on the turntable). The 3D coordinates of every reference point (18) on the 3D calibration pattern (16) are pre-measured. Since the 3D calibration pattern (16) has a known origin and orientation, the above placement defines the position and orientation of the object space in the scene. That is, each reference point (18) gives (x, y, z) in the object space.

Referring again to FIG. 1c, the object (10) to be modeled may itself be used as the calibration reference. In that regard, the user measures (or estimates) the dimensions of the room (10). Those dimensions are then used with selected feature points, such as the corners (20) of the room (10), for calibration.

More specifically, arbitrarily define a point (20) on the surface of the object (10) as the origin of the object space. Arbitrarily define the x-y plane (22) and the direction of x-axis (24) in the x-y plane (22). Rotating the x-axis (24) counterclockwise by 90° in the x-y plane (22) gives the y-axis (26). The z-axis (28) is then in the direction along the vector cross-product of x- and y-axes (24, 26). This defines the position and orientation of the coordinate system.

Select as many feature points (20) as possible as reference points and measure the 3D coordinates of these reference points in the object space. For example, pick the first feature point a as the origin. The direction from a to the second feature point b defines the direction of x-axis (24). Let the distance from a to b be d, then b's 3D coordinates are (d, 0, 0).

The more reference points that are used, generally, the more accurate the result will be. However, the method works even if no 3D measurement is available at all. The minimum is to define (1) a feature point a as the origin; (2) the direction of the x-axis (24) by specifying a feature point (20) on x, such as the feature point b above; and (3) the unit size of the coordinate system, such as the value of d explained above. If d is not easily measurable, let d=1 and then the size of the model will be generated in the unit of d.

Next, calibration is undertaken to determine the geometric relationship between each camera-position and the object space. Using a data entry device, such as a mouse, the user enters reference points for calibration in the calibration images and runs the calibration program, which computes the internal and external parameters of each camera and the relationships between cameras using the reference points. In other words, it computes the position and orientation of the camera optical system and correct lens distortions.

One of the following two methods can be used for calibration: the reference-rich method, or the reference-scarce method. The necessary condition for use of the reference-rich method is that at least 6 non-coplanar reference points are visible for each view. If the condition is not met, the reference-scare method is used.

The reference-rich method is described in detail in J. Weng, P. Cohen and M. Herniou, "Camera Calibration With Distortion Models and Accuracy Evaluation", IEEE Transactions on Pattern Analysis and Machine Intelligence, vol. 14, no. 10, October 1992, pp. 965–980, which is hereby incorporated by reference. The result of this method is a projection matrix C for each camera view (plus a few optional parameters for lens distortion correction), which includes internal and external parameters of the camera view. Some advantages of this method are that it is fast and does not require the user to provide approximate positions and orientations of each camera view. When the 3D calibration pattern (16) of FIG. 2 is used, the number of reference points (18) is large and the reference-rich method can be used.

More specifically, as previously stated, in order to obtain 3D information from the camera images taken, each image must be calibrated. That is, the exact position and orientation of the camera relative to the object must be known for each image. This information describes the relationship between the object space and what is viewed in the camera image.

The camera-object relationship is a perspective projection, which is a simple geometric transformation. This takes the form of the calibration matrix, C. This matrix maps the 3D world coordinates (x,y,z) of the object to the image coordinates (col, row):

$$\begin{bmatrix} c_{1,1} & c_{1,2} & c_{1,3} & c_{1,4} \\ c_{2,1} & c_{2,2} & c_{2,3} & c_{2,4} \\ c_{3,1} & c_{3,2} & c_{3,3} & c_{3,4} \end{bmatrix} \begin{bmatrix} x \\ y \\ z \\ 1 \end{bmatrix} = \begin{bmatrix} t \cdot col \\ t \cdot row \\ t \end{bmatrix} \quad (1)$$

The image center has (col, row)=(0, 0).

C may be normalized by dividing through by $C_{3,4}$, thus we can set $C_{3,4}$ equal to 1. Rewriting equation (1) gives us:

$$col = \frac{c_{1,1}x + c_{1,2}y + c_{1,3}z + c_{1,4}}{c_{3,1}x + c_{3,2}y + c_{3,3}z + c_{3,4}} \quad (2)$$

$$row = \frac{c_{2,1}x + c_{2,2}y + c_{2,3}z + c_{2,4}}{c_{3,1}x + c_{3,2}y + c_{3,3}z + c_{3,4}}$$

C captures all needed information about the camera/object space relationship, such as the camera's position, orientation, and focal length. To solve for C, we use a calibration object. This is an object with easily recognizable vertices/features, and whose exact dimensions are known. By taking a picture of the calibration object, we may determine the calibration matrix of the camera. The system in equation (2) may be expressed as the pair of linear equations:

$$xc_{1,1}+yc_{1,2}+zc_{1,3}+c_{1,4}-col.x.c_{3,1}-col.y.c_{3,2}-col.z.c_{3,3}=col$$

$$xc_{2,1}+yc_{2,2}+zc_{2,3}+c_{2,4}-row.x.c_{3,1}-row.y.c_{3,2}-row.z.c_{3,3}=row$$

We know the 3D position (xi, yi, zi) of each calibration object vertex i that is visible in the image at (col$_i$,row$_i$). Each such 5-tuple gives another pair of these linear equations, in which only the eleven c terms are unknown. Thus with as few as 6 vertices, we have an over-determined system of equations, written in matrix form as:

$$\begin{bmatrix} x_1 & y_1 & z_1 & 1 & 0 & 0 & 0 & 0 & -col_1 \cdot x_1 & -col_1 \cdot y_1 & -col_1 \cdot z_1 \\ 0 & 0 & 0 & 0 & x_1 & y_1 & z_1 & 1 & -row_1 \cdot x_1 & -row_1 \cdot y_1 & -row_1 \cdot z_1 \\ x_2 & y_2 & z_2 & 1 & 0 & 0 & 0 & 0 & -col_2 \cdot x_2 & -col_2 \cdot y_2 & -col_2 \cdot z_2 \\ 0 & 0 & 0 & 0 & x_2 & y_2 & z_2 & 1 & -row_2 \cdot x_2 & -row_2 \cdot y_2 & -row_2 \cdot z_2 \\ \vdots & \vdots & \vdots & \vdots & \vdots & \vdots & \vdots & \vdots & \vdots & \vdots & \vdots \\ x_n & y_n & z_n & 1 & 0 & 0 & 0 & 0 & -col_n \cdot x_n & -col_n \cdot y_n & -col_n \cdot z_n \\ 0 & 0 & 0 & 0 & x_n & y_n & z_n & 0 & -row_n \cdot x_n & -row_n \cdot y_n & -row_n \cdot z_n \end{bmatrix} \begin{bmatrix} c_{1,1} \\ c_{1,2} \\ c_{1,3} \\ c_{1,4} \\ c_{2,1} \\ c_{2,2} \\ c_{2,3} \\ c_{2,4} \\ c_{3,1} \\ c_{3,2} \\ c_{3,3} \end{bmatrix} = \begin{bmatrix} col_1 \\ row_1 \\ col_2 \\ row_2 \\ \vdots \\ col_n \\ row_n \end{bmatrix} \quad (3)$$

This system is in the familiar Ax=b form, and may be solved using a least-squares fitting routine. More vertices specified yields a more accurate calibration, and practice has shown acceptable results for this application with 10 to 15 vertices.

As previously stated, calibration may also be undertaken according to a reference-scarce method. Since the object to be modeled does not change its shape when different images are taken, the fixed set of model points make it possible to determine the position and orientation of each camera view.

The necessary condition for the reference-scarce method is that there are at least 3 model points for each camera view. More model points are desirable to provide a more accurate result. It is also desirable to track the same reference point over as many views as possible.

For more accurate and stable results using the reference-scarce method, the effective focal lengths $f_u$ and $f_v$ of the camera should be determined. In that regard, referring now to FIGS. 3a–3b and 4, an image focal length calibration apparatus for one embodiment of the present invention, and a geometric representation of an image focal length calibration for one embodiment of the present invention are shown.

Figure 3A:
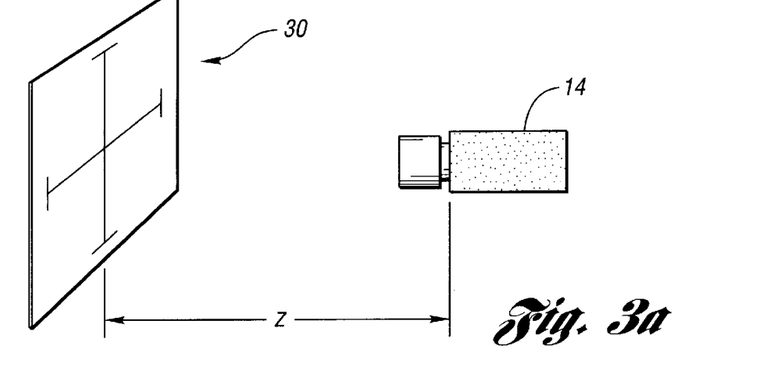
FIGS. 3a–3b are an image focal length calibration apparatus for one embodiment of the method and system of the present invention.
Figure 3B:
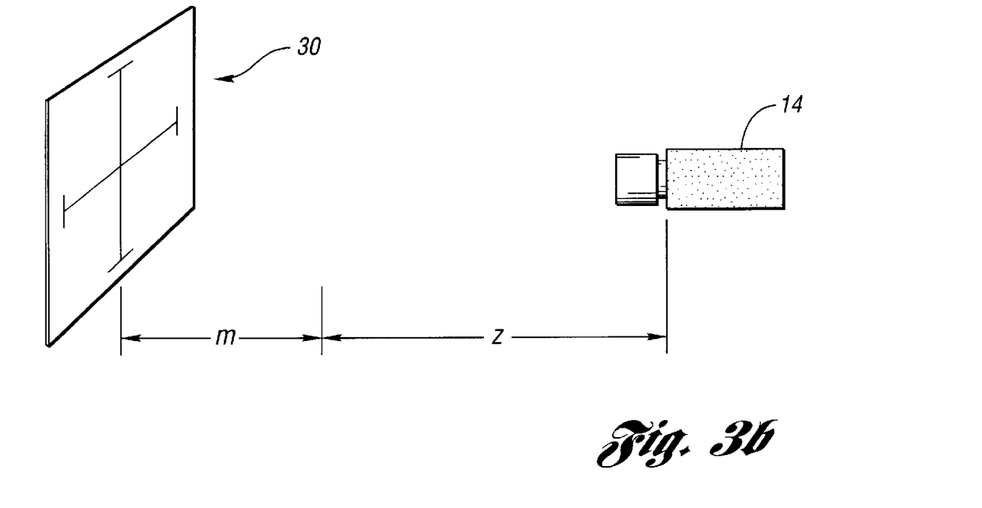

As seen in FIGS. 3a–3b, a rectangular cross pattern (30) is placed vertically at an unknown distance z from the camera (14), and a first image $I_1$, is taken. Cross pattern (30) is then moved farther from the camera (14) by a distance m, and a second image $I_2$ is taken. The cross pattern (30) at the first and second positions (z and z+m) can be either the same or different. The distances z and z+m should be roughly the minimum and maximum distances at which the object feature points are imaged. At both distances, the rectangular cross pattern (30) should be roughly orthogonal to the optical axis of the camera (14), which may be judged visually.

Figure 4:
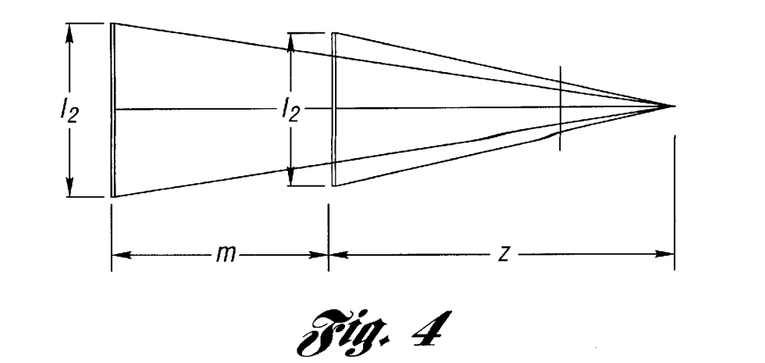
FIG. 4 is a geometric representation of an image focal length calibration for one embodiment of the method and system of the present invention.

As seen in FIG. 4, suppose that in $I_1$, the horizontal segment of the first cross is $p_1$-pixel long, and in $I_2$ the horizontal segment of the second cross is $p_2$-pixel long. Let the effective focal length of the camera for horizontal direction be $f_u$. Thus, we have:

$$\frac{p_1}{f_u} = \frac{l_1}{z} \quad (4)$$

$f_u$ takes into account of image digitization. For $I_2$, similarly we have:

$$\frac{p_2}{f_u} = \frac{l_2}{z+m} \quad (5)$$

From the above two equations, we eliminate z and get:

$$f_u = \frac{p_1 p_2 m}{p_1 l_2 - p_2 l_1} \quad (5)$$

The above value of $f_u$ is in the number of (horizontal) pixels. Similarly, the value of $f_v$, the effective vertical focal length, is computed using the same setup in FIGS. 3a–3b.

With the reference-scarce method, feature points are used to determined the position and orientation of each camera which in turn determines the 3D position of the feature points. Suppose that (r,c) are the pixel-array row and column numbers, respectively, of a feature point measured with respect to the center of a digital image. We define (u,v) to be the camera-centered image coordinates as:

$$u = \frac{r}{f_u} \quad v = \frac{c}{f_v} \quad (7)$$

Using the homogeneous coordinate system, it follows that a point (x,y,z) in the object space is projected onto (u,v) i the image space, with:

$$\begin{bmatrix} uw \\ vw \\ w \end{bmatrix} = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix} = M \begin{bmatrix} x \\ y \\ z \\ 1 \end{bmatrix} \quad (8)$$

where w is a non-zero scale number and $$R = \begin{bmatrix} r_{11} & r_{12} & r_{13} \\ r_{21} & r_{22} & r_{23} \\ r_{31} & r_{32} & r_{33} \end{bmatrix} \quad (9)$$

is a rotational matrix, and $(t_1, t_2, t_3)$ is a translational vector. R has three free parameters $\alpha_1, \alpha_2, \alpha_3$. Therefore, for each camera, there are 6 external parameters.

Through a graphics interface, the user indicates the approximate position and orientation of each camera at which each image is taken. This gives an approximate starting value of external parameters $(\alpha_1, \alpha_2, \alpha_3, t_1, t_2, t_3)$ for each camera. For each point visible from one camera, equation (8) gives:

$$(ur_{31}-r_{11})x+(ur_{32}-r_{12})y+(ur_{33}-r_{13})z=t_1-ut_3$$
$$(vr_{31}-r_{21})x+(vr_{32}-r_{22})y+(vr_{33}-r_{23})z=t_2-vt_3 \quad (8')$$

which are linear in x, y, z. If a feature point is visible by $j \leq 2$ camera, there are 2j linear equations in terms of x, y, z. We use the linear least-squares algorithm to solve for x, y, z. Geometrically, this is a multi-camera triangulation for determining the 3D position of a feature point. Once the 3D position of all feature points are estimated, for each camera equation (8) gives:

$$uxr_{31}+uyr_{32}+uzr_{33}+ut_3-xr_{11}-yr_{12}-zr_{13}-t_1=0$$
$$vxr_{31}+vyr_{32}+vzr_{33}+vt_3-xr_{21}-yr_{22}-zr_{23}-t_2=0 \quad (8'')$$

which are two equations in the 6 camera external parameters $(\alpha_1, \alpha_2, \alpha_3, t_1, t_2, t_3)$. Given a minimal of 3 feature points in (x, y, z), the above relationship gives 6 equations and the 6 camera external parameters may then be solved using an iterative least-squares algorithm, such as the Levenberg-Marquardt algorithm.

Thus, the 6 external parameters of each camera view are computed from the graphics interface input provided by the user. In that regard, the user first gives a rough estimate of roll, pitch and yaw of the camera and the rough (x, y, z) position of the camera.

Thereafter, using equation (8'), the 3D position (x, y, z) for each feature point is estimated using all the views from which the point is visible. If the feature point is a reference point, such a computation is not needed for the point.

Next, using equation (8''), the 6 external parameters for each camera are computed. If a point (x, y, z) is a reference point, a large positive constant c is multiplied to the two corresponding equations in (8'') so that a much higher weight is placed on that point in the lest square solution of the 6 external parameters.

Finally, if the total modification of all the camera internal parameters is smaller than a threshold ($\delta$), the procedure stops. Otherwise, the external parameters of the camera are updated and the prior steps concerning estimating the 3D position of each feature point and computing the 6 external camera parameters are repeated. When the threshold ($\delta$) is no longer exceeded, the external parameters of each camera view have been adequately determined.

Figure 5:
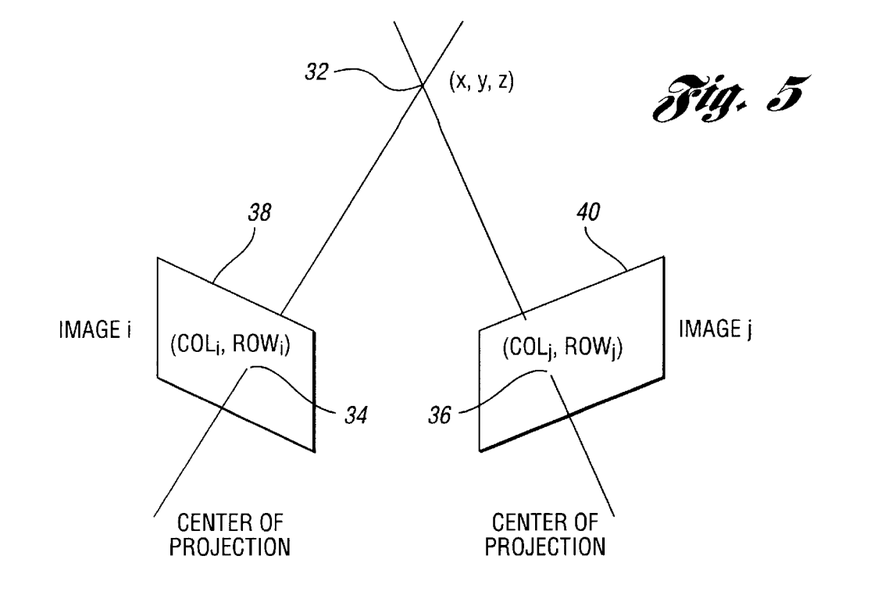
FIG. 5 is a graphic representation of stereo triangulation of a three-dimensional point from multiple image projections according to the method and system of the present invention.

Upon completion of calibration, multiview stereo triangulation is undertaken. In that regard, referring now to FIG. 5, a graphic representation of stereo triangulation of a three-dimensional point from multiple image projections according to the present invention is shown. As seen therein, triangulation computes the 3D position (32) in the object space of each image feature point (34, 36). If the same point (32) in the object space is visible from two different views (38, 40), it will appear in a different location (34, 36) in each image (38, 40).

For the reference-rich method, note that for each image the relationships in equations (1) and (2) still hold. Equation (2) may be rewritten as:

$$(c_{1,1}-\text{col}.c_{3,1})x+(c_{1,2}-\text{col}.c_{3,2})y+(c_{1,3}-\text{col}.c_{3,3})z=\text{col}-c_{1,4}$$

$$(c_{2,1}-\text{row}.c_{3,1})x+(c_{2,2}-\text{row}.c_{3,2})y+(c_{2,3}-\text{row}.c_{3,3})z=\text{row}-c_{2,4} \quad (10)$$

Thus we can solve for the 3D world coordinates (x, y, z) of a point, since these are the only unknowns in equation 5. Each image i has calibration matrices $C_i$, and the projected location of the point is ($\text{col}_i$, $\text{row}_i$). Thus, with at least two images, we have an over-determined system of linear equations, written in matrix form as:

$$\begin{bmatrix} (c_{1_{1,1}} - col_1 \cdot c_{1_{3,1}}) & (c_{1_{1,2}} - col_1 \cdot c_{1_{3,2}}) & (c_{1_{1,3}} - col_1 \cdot c_{1_{3,3}}) \\ (c_{1_{2,1}} - row_1 \cdot c_{1_{3,1}}) & (c_{1_{2,2}} - row_1 \cdot c_{1_{3,2}}) & (c_{1_{2,3}} - row_1 \cdot c_{1_{3,3}}) \\ (c_{2_{1,1}} - col_2 \cdot c_{2_{3,1}}) & (c_{2_{1,2}} - col_2 \cdot c_{2_{3,2}}) & (c_{2_{1,3}} - col_2 \cdot c_{2_{3,3}}) \\ (c_{2_{2,1}} - row_2 \cdot c_{2_{3,1}}) & (c_{2_{3,2}} - row_2 \cdot c_{2_{3,2}}) & (c_{2_{2,3}} - row_2 \cdot c_{2_{3,3}}) \end{bmatrix} \begin{bmatrix} x \\ y \\ z \end{bmatrix} = \begin{bmatrix} col_1 - c_{1_{1,4}} \\ row_1 - c_{1_{2,4}} \\ col_2 - c_{2_{1,4}} \\ row_2 - c_{2_{2,3}} \end{bmatrix} \quad (11)$$

This is also in the form Ax=b, and may be solved using a least-squares fitting routine. Note that the coordinates of the 3D point determined will be based on the same coordinate system as the calibration object.

Stereo triangulation for the reference-scarce method is the same as for the reference-rich method. The three parameters ($\alpha_1$, $\alpha_2$, $\alpha_3$) determine the rotation matrix R in equation (9):

$$R = \begin{bmatrix} r_{11} & r_{12} & r_{13} \\ r_{21} & r_{22} & r_{23} \\ r_{31} & r_{32} & r_{33} \end{bmatrix} \quad (12)$$

The projection matrix C is determined by:

$$C = \begin{bmatrix} f_u r_{11} & f_u r_{12} & f_u r_{13} & f_u t_1 \\ f_v r_{21} & f_v r_{22} & f_v r_{23} & f_v t_2 \\ r_{31} & r_{32} & r_{33} & t_3 \end{bmatrix} \quad (13)$$

Equation (11) is then used to determine (x, y, z) of each point.

Where the reference-rich method has been employed, it should be noted that at this stage the user has the option of executing those steps from the reference-scarce method concerning estimating the 3D position of each feature point, and computing the 6 external camera parameters to within a threshold (δ). In so doing, results from the reference-rich method may be further optimized.

A user friendly interface is provided for calibration and model building. In order to determine a calibration, the user clicks a button to load an image and display it in a window of the graphics interface. For a known visible vertex of the calibration object in the image, the user clicks on the vertex, which defines the 2D coordinates of the point. The user is then presented with a dialog box into which they may enter the 3D coordinates of the point. This is repeated for each vertex.

When completed, the user can save this information into a file, for later associating with a model object image. For example, the calibration of a reference object in position 45 degrees may be saved to be used in the future for any model object image for the same position. This calibration process is repeated for each view and need only be done once. As long as the relative camera orientations do not change, as many models as wanted can be created without the user ever having to enter 3D data.

For model building, the CAVRB graphics-interface includes two windows for viewing a pair of color images. Each image is loaded and displayed by specifying the image's file name. The CAVRB assumes a 256 color display, and quantizes each image to 100 colors, which leaves room in the colormap for the rest of the interface. Each image window thus uses a disjoint half of the colormap, and a hashing table is used to find color value locations in the pixmap.

Figure 6A:
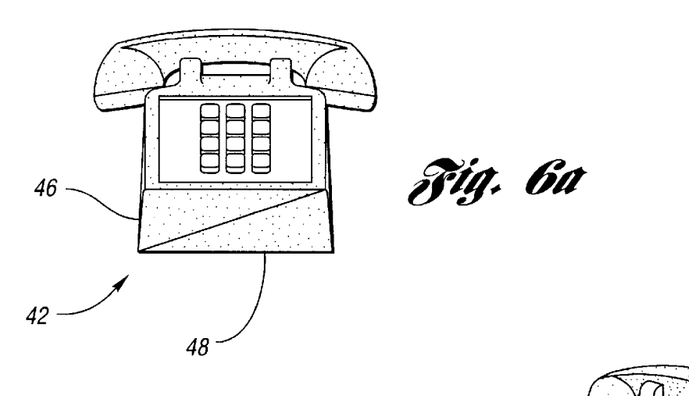
FIGS. 6a–6b are graphic representations of image surface definition according to one embodiment of the method and system of the present invention.
Figure 6B:
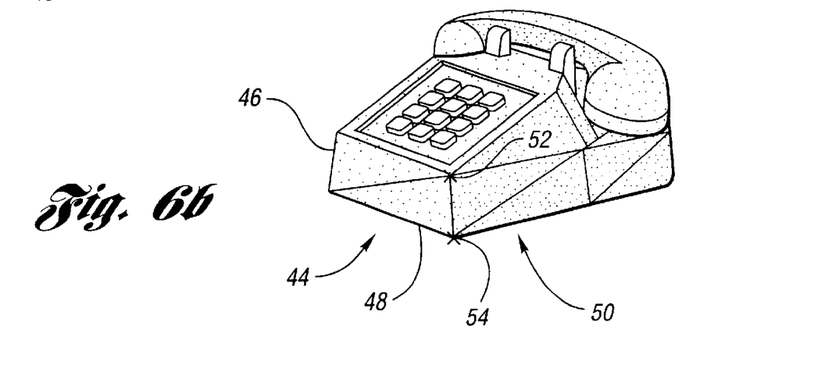

Referring next to FIGS. 6a–6b, graphic representations of two such images for surface definition according to one embodiment of the present invention are shown. In the preferred embodiment, the user defines a polygon (42) in an image simply by entering its vertex coordinates, such as by clicking a mouse. Upon completion, a copy of the polygon (44) is automatically placed in the other image window. The user then need only adjust the vertices to match the new image's orientation. This prevents there ever being a different number of vertices in the two polygons. It also forces correspondence between each polygon's vertices.

After a pair of polygons (42, 44) is defined, they may be modified. By clicking the mouse, the user can delete points individually or all at once, with the corresponding vertices being deleted from the other view. The user can also move points, or move the entire polygon. Anytime a vertex is clicked on in one image, the corresponding vertex is highlighted in the other.

In addition to specifying polygon vertices, the user may specify interior points, such as the keypad of the telephone depicted in FIGS. 6a–6b. These are feature points within the bounds of a polygon, and simply act as additional vertices for the polygon. This allows recognizable points in the middle of a facet of the model object to be easily specified and accurately modeled. The user can specify an interior point by clicking first in one image, then in the other, repeating as desired.

After changing views, the user can still recall previously defined polygons. Each polygon is displayed, in turn, in its best view, and the user can choose it, or go on to the next (or previous) polygon. There are two ways to recall the polygon, once chosen. One way is to display two previously defined views of the polygon within the appropriate view image. This allows the user to change their previous definition. Alternatively, the user may display only one previous view (the best view) of the polygon in one image window, and copy the polygon into the other existing view. This allows the user to define more than two views for a polygon, providing more accuracy in triangulation.

When the user is satisfied with the current polygon pair, they may press a button to store it and go on to the next. Still referring to FIGS. 6a–6b, the current polygon is then broken up into triangles (46, 48), or "triangulated". The triangles (46, 48) are then filled to obscure the underlying picture. This allows the user to i) see the triangulation so that they may modify the vertices, and ii) see what part of the image is already done, so that they may ignore it in the future. The user may now work on the next polygon. At any time, the user may go back to previously defined polygons and modify their vertices. Furthermore, the user can load in a new image, or new pair of images. Each 2D triangle corresponds to a 3D triangular planar surface.

It should be noted that, in addition to polygons, curved primitives could also be used, such as circles and/or splines. For example, the user would specify control points of a spline curve in both images. The CAVRB would calculate the 3D equivalent and, as discussed in greater detail below, would map the texture from the images onto the 3D curved surface.

In that regard, the user could view each vertex through the graphics interface and determine if each polygonal vertex needs to be turned into a spline vertex. If it does, the user could then turn each line segment that joints the vertex into a Bézier curve and edit the curve through a set of 3 windows (x, y, z directions). All the surfaces that share this vertex could then be turned into Bézier surfaces.

When all images are calibrated and all polygons specified, the 3D model may then be constructed. The user is first presented with a dialog box for the file name of the output. The CAVRB next calculates all camera calibrations, triangulates all polygons, and begins the process of interpolygon vertex matching.

In that regard, referring now to FIG. 6b, different polygons (44, 50) can often share one or more common vertices (52, 54). However, since these different polygons are presumably visible from separate views, the stereo triangulation procedure will calculate slightly separate 3D positions for such vertices. This results in a gap or overlap between neighboring facets. These are very noticeable in the final model, since they result in a "hole" in the object through which one can see background textures and objects.

Such gaps between polygons can be eliminated by forcing corresponding vertices to have the same 3D coordinates. Therefore, it is necessary to provide a mechanism by which the user can specify vertices that are shared between polygons. The CAVR Builder uses a post-production philosophy that lets the user specify such matches as the final 3D model is calculated.

When possible, the CAVRB automatically calculates many vertex matches. If, in a single view, two polygons have a vertex very near each other, these may be automatically matched. However, polygons with shared vertices may never have occurred in the same view. Therefore, the program next calculates all possible pairs of 3D vertices, and sorts these pairs according to increasing distance. The user is presented with each, and inputs whether or not they are the same. Specifically, the CAVRB calculates and displays an image view in which the vertex occurred, and highlights the position of the vertex. It is then simple for the user to see if the two vertices are indeed the same. Furthermore, the pairs are presented in order of distance, with closest (best possible chance of a match) first. At any time, the user may interrupt the process (e.g., when the distance represented is too great to merit further search).

It should be noted that, rather than defining which vertices of which polygons are shared at the last step, vertex sharing could be integrated into the interface. The user could define vertices first, then polygons would simply be created by specifying which vertices they contain. Care would be needed to make sure the vertices of a polygon in separate views correspond to one another.

At this time, the CAVRB recalculates the 3D position of vertices, taking into account all views of all polygons that share a vertex. Then, for each triangle of each 3D polygon, its vertices are saved.

Figure 7A:
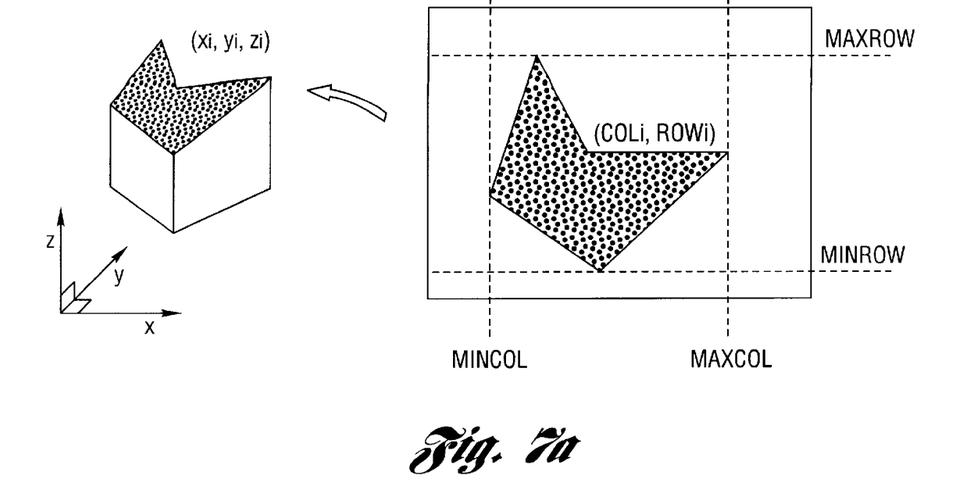
FIGS. 7a–7b are graphic representations of texture mapping according to various embodiments of the method and system of the present invention.
Figure 7B:
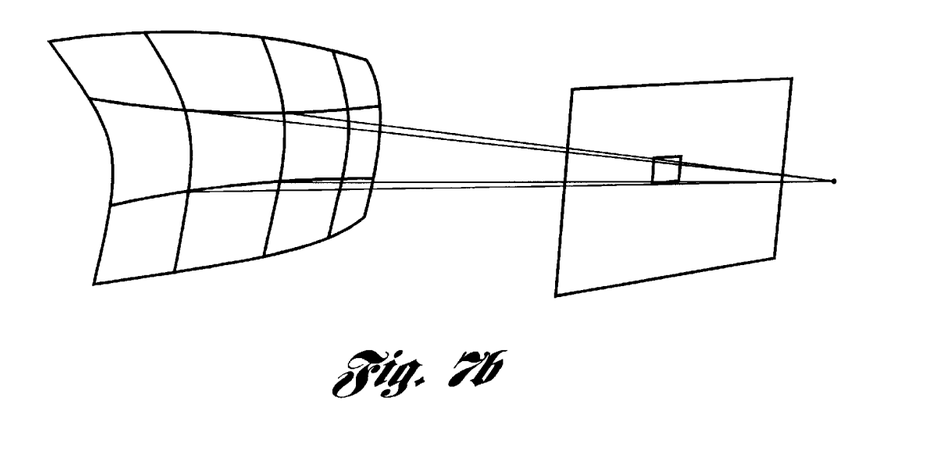

Referring now to FIGS. 7a–7b, graphic representations of texture mapping according to various embodiments of the present invention are shown. Color texture is imperative for a realistic model. A human observer is extremely sensitive to texture accuracy, more so than positional accuracy. For example, if a model is made of a computer monitor, a texture map of a typical computer screen adds realism. If the screen texture is not accurate, the observer will notice more than if, say, the vertices of the monitor were slightly mispositioned. Texture plays an important role in a model, because it gives many visual cues as to the make-up of the object. Shading, lighting, reflectance, and geometry all are encapsulated by texture. It is often desirable to minimize lighting effects in CAVR model building by using uniform ambient lighting.

The user first decides the view from which to acquire a texture map. Since each polygon defined is visible from at least two views, there is a choice of which image to use as a texture map for each final 3D polygon. This is an important decision, since the realism of the texture map depends on it. Use of a view away from the polygon (in which the polygon appears at a sharp angle) results in a 3D face that (even when viewed face-on) has the color texture of an off-center view. This will likely be blurry, and could confuse the geometry of the object. One solution to this is to calculate, for each view of a polygon, its view vector, and compare that with the normal to the polygon. This gives the most "head-on" view. Sometimes, however, it is desirable not to use this view, for example, if another view has better lighting. It is preferred, then, to i) automatically calculate the most "head-on" view, and ii) let the user override this choice if needed.

Alternatively, the best view can be easily approximated. Specifically, we may use the view that has a largest bounding rectangle of the projected polygon. Since, in general, more direct views will have larger projected polygons (and thus bounding rectangles), this gives a satisfactory approximation.

Once a best view is determined, the polygon is broken up into triangles. The triangulation makes a basic building block for texture mapping routines, and the final renderer. This is performed using the Delaunay triangulation method. Thus, the 3D triangulation of a polygon is determined by the 2D triangulation of its best view projection.

Still referring to FIGS. 7a–7b, texture mapping is used to enhance the realism of the model. The 3D shape of the model is a set of flat, polygonal facets, onto which is mapped the color texture from an image of the original object. Each 3D (x,y,z) point of the facet corresponds to a 2D (u,v) position on the texture. We need only calculate the (u,v) parameters for vertices, since the parameters for non-vertices are simple interpolations of the parameters for vertices.

The texture map is in the form of a rectangular pixmap, and each u and v is in the range [0,1] where 0 represents the left or top edge, and 1 represents the right or bottom edge of the pixmap. The 3D position of each vertex of a polygon is calculated from the procedure described earlier. We choose an image in which the polygon is visible as a texture map. For each vertex i, we have calculated $(x_i,y_i,z_i)$, and we know the $(col_i, row_i)$ from the mouse position the user clicked to define this point in this view. To save space, we clip the pixmap so that we only use the area needed, as shown in FIG. 7a. To this end, we define variables for the extent of the used region:

$$\min col = \min_{\forall i} \{col_i\}$$
$$\max col = \max_{\forall i} \{col_i\}$$
$$\min row = \min_{\forall i} \{row_i\}$$
$$\max row = \max_{\forall i} \{row_i\}$$

(14)

Now, to obtain the range [0,1], we express $(u_i,v_i)$ as the percentage of the distance along the clipped region:

$$u_i = \frac{col_i - \min col}{\max col - \min col} \quad v_i = \frac{row_i - \min row}{\max row - \min row}$$

(15)

We have therefor determined the mapping of the texture in the best view image, clipped by (mincol, maxcol, minrow, maxrow), into the polygon defined by $(x_i,y_i,z_i)$ $\forall i$, using the parameters $(u_i,v_i)$.

As previously discussed, since lighting information is being saved into a model (via textures), it is important to control it in the environment. If using a rotating object, allowing only ambient light is better, since any specularity will end up in many views, thus on many faces of the model. Using a fixed object position prevents this problem, since lighting is at least consistent from view to view. Similarly, shading is to be avoided. If any shadows occur, they will end up in the model. The shadow will probably not be appropriate for the environment in which the modeled object is placed, since the light source will likely have changed.

The texture mapping process discussed above maps texture onto 3D planar triangles by back projecting each pixel from its texture-map image onto the planar surface. As is readily apparent to those of ordinary skill in the art, this is a special case of mapping texture to a curved surface. Indeed, it should be noted that texture may also be mapped onto 3D Bézier surfaces, if such surfaces are used as described above, as shown in FIG. 7b.

The CAVRB also provides a user-friendly graphics interface to handle display of color images, polygon definition, and calibration. It further performs the triangulation computations necessary to produce the 3D model. The CAVRB program preferably produces a model in the form of a QuickDraw 3D file or VRML file, although any other 3D format with texture maps may be used. This file can then be input and displayed using a 3D graphics viewer or may be incorporated into other virtual reality scenes for walkthrough. In this way, readily available, inexpensive hardware is used.

As is readily apparent to those of ordinary skill in the art, some objects are better suited to the CAVRB modeling method than others. For example, a set of books represents an object that is very well suited for CAVRB. It has flat, well textured faces that are easily recognized and contain few vertices. It therefore is relatively trivial to model.

Figure 8:
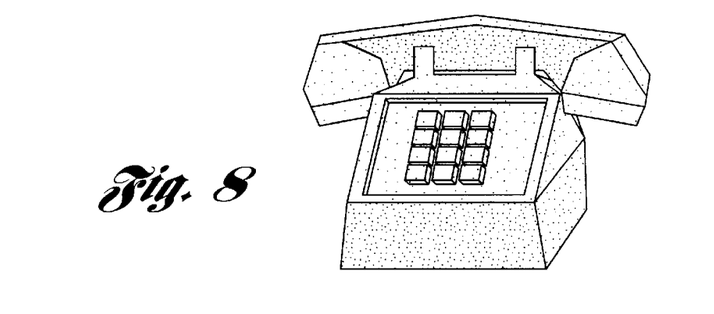
FIG. 8 is a graphic representation of a three-dimensional virtual reality object model built according to one embodiment of the method and system of the present invention.

The telephone depicted in FIGS. 6a–6b, however, is more difficult to model since it has fewer flat surfaces. It therefore requires more polygons and vertices to model accurately if one uses only planar surfaces. FIG. 8 shows a graphic representation of a three-dimensional virtual reality object model built according to one embodiment of the present invention. A user may create a smoother 3D model by using more planer surfaces, or the 3D Bézier surfaces as discussed above.

As is readily apparent from the foregoing description, then, the present invention provides an improved method and system for building 3D object models. More specifically, prior to the present invention, there were no integrated methods and systems capable of quickly, easily and inexpensively constructing realistic virtual reality objects.

The present invention successfully creates 3D models with texture that are highly realistic. It provides a unique and intuitive way to build a model, and automatic mapping of texture from images of the real object onto that model. Furthermore, the system is user-friendly and inexpensive, being run on readily available hardware and software.

Compared to pure graphics methods, the CAVRB is easier to use since it employs images taken from a camera rather than requiring the user to have the ability to mathematically model an object. The same camera images used by the CAVRB also provide the 3D model with a more realistic look even if the 3D surface is an approximation. The CAVRB is also less costly in equipment and manpower. The system uses a simple apparatus and one or several popular digital still cameras or conventional video cameras.

Compared to laser scanning, the CAVRB is much less expensive. The CAVRB is also less intrusive to human and animal subjects, and is more generally applicable as it may be used with long distance, large objects, as well as glossy and dark surfaces. Moreover, the CAVRB provides more realistic colors and textures since it uses color images from video, film or digital still cameras.

Compared to the QuickTime VR, the CAVRB provides a truly navigable 3D model without restrictions on viewing position. The data also takes much less space to store and transmit, since each environment has a single representation.

It is to be understood that the present invention has been described in an illustrative manner and the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

What is claimed is:

1. A method for building a virtual reality model of an object, the method comprising:
    defining an object space including
        generating a plurality of two-dimensional images of a reference object, each image having a projection center,
        selecting at least three reference points in each image, the reference points having a predetermined three-dimensional relationship therebetween,
        determining a horizontal and a vertical focal length associated with each image,
        determining a preliminary position and orientation of each projection center, and
        determining a final position and orientation of each projection center based on the reference points, the horizontal and vertical focal lengths, and the preliminary position and orientation of the projection center of each image;
    generating a plurality of two-dimensional real images of the object;

selecting a plurality of reference points in each image, the reference points defining an image region, the region having a texture;

determining the three-dimensional position in the object space of each of the reference points in each image, the positions determined defining a model surface;

mapping the texture of an image region onto a model surface; and generating a three-dimensional model of the object using the determined positions and the mapped texture.

2. The method of claim 1 further comprising determining whether a selected reference point is common to a plurality of image regions.

3. The method of claim 1 wherein the model surfaces are two-dimensional.

4. The method of claim 1 wherein the image regions are selected from the group consisting of polygons, circles and splines.

5. The method of claim 4 wherein at least one of the model surfaces is three-dimensional.

6. The method of claim 1 wherein the three-dimensional model of the object generated is continuously navigable.

7. The method of claim 1 wherein the texture of an image region mapped onto a model surface is the texture of an image region having a large area relative to other image regions.

8. The method of claim 1 wherein the step of selecting at least 3 referent points comprises selecting at least six reference points in each image, the reference points having a pre-determined non-coplanar three-dimensional relationship therebetween.

9. The method of claim 1 wherein each of the plurality of two-dimensional real images of the object is generated from a different position relative to the object.

10. A method for building a virtual reality model of an object, the method comprising:

means for defining an object space including means for generating a plurality of two-dimensional images of a reference object, each image having a projection center, means for selecting at least three reference points in each image, the reference points having a predetermined three-dimensional relationship therebetween, means for determining a horizontal and a vertical focal length associated with each image, means for determining a preliminary position and orientation of each projection center, and means for determining a final position and orientation of each projection center based on the reference points, the horizontal and vertical focal lengths, and the preliminary position and orientation of the projection center of each image;

means for generating a plurality of two-dimensional real images of the object;

means for selecting a plurality of reference points in each image, the reference points defining an image region, the region having a texture;

means for determining the three-dimensional position in the object space of each of the reference points in each image, the positions determined defining a model surface;

means for mapping the texture of an image region onto a model surface; and means for generating a three-dimensional model of the object using the determined positions and the mapped texture.

11. The system of claim 10 further comprising means for determining whether a selected reference point is common to a plurality of image regions.

12. The system of claim 10 wherein the model surfaces are two-dimensional.

13. The system of claim 10 wherein the image regions are selected from the group consisting of polygons, circles and splines.

14. The system of claim 13 wherein at least one of the model surfaces is three-dimensional.

15. The system of claim 10 wherein the three-dimensional model of the object generated is continuously navigable.

16. The system of claim 10 wherein the texture of an image region mapped onto a model surface is the texture of an image region having a large area relative to other image regions.

17. The system of claim 10 wherein
the means for selecting at least 3 referent points comprises selecting at least six reference points in each image, the reference points having a pre-determined non-coplanar three-dimensional relationship therebetween.

18. The system of claim 10 wherein each of the plurality of two-dimensional real images of the object is generated from a different position relative to the object.

* * * * *